(12) United States Patent
Fujisawa et al.

(10) Patent No.: US 7,391,234 B2
(45) Date of Patent: Jun. 24, 2008

(54) CIRCUIT AND CIRCUIT CONNECTING METHOD

(75) Inventors: Hisanori Fujisawa, Kawasaki (JP); Miyoshi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 11/395,125

(22) Filed: Apr. 3, 2006

(65) Prior Publication Data

US 2007/0046326 A1    Mar. 1, 2007

(30) Foreign Application Priority Data

Aug. 24, 2005    (JP) ............................. 2005-243111

(51) Int. Cl.
*H04L 12/56* (2006.01)
*H03K 19/173* (2006.01)

(52) U.S. Cl. ............................ 326/38; 326/41; 370/386; 370/388

(58) Field of Classification Search .................. 326/38, 326/41, 47; 370/386, 388
See application file for complete search history.

(56) References Cited

U.S. PATENT DOCUMENTS

2002/0146003 A1    10/2002   Kam et al.
2004/0136717 A1    7/2004    Zhang et al.
2004/0236815 A1    11/2004   Mirsky et al.
2005/0129043 A1*   6/2005    Konda ........................ 370/412

FOREIGN PATENT DOCUMENTS

JP    7-71353 B2    7/1995
JP    2786246 B2    5/1998

* cited by examiner

*Primary Examiner*—Daniel D Chang
(74) *Attorney, Agent, or Firm*—Arent Fox LLP

(57) ABSTRACT

A network structure configures a blocking network having constraint against such a combination of said network input terminal and network output terminal as to make it unfeasible to further connect, when connecting first network input terminals to first network output terminals, second network input terminals to any one of the second network output terminals, and operation elements and the network output terminals are connected so as to minimize a constraint strength between the plurality of network output terminals inputting to the same operation element with respect to the constraint strength defined as the number of network input terminals contained in tuples of network input terminals to which the two network output terminals in the network output terminals can not be simultaneously connected.

9 Claims, 19 Drawing Sheets

☐ : CROSSBAR SWITCH BLOCK

FIG. 2
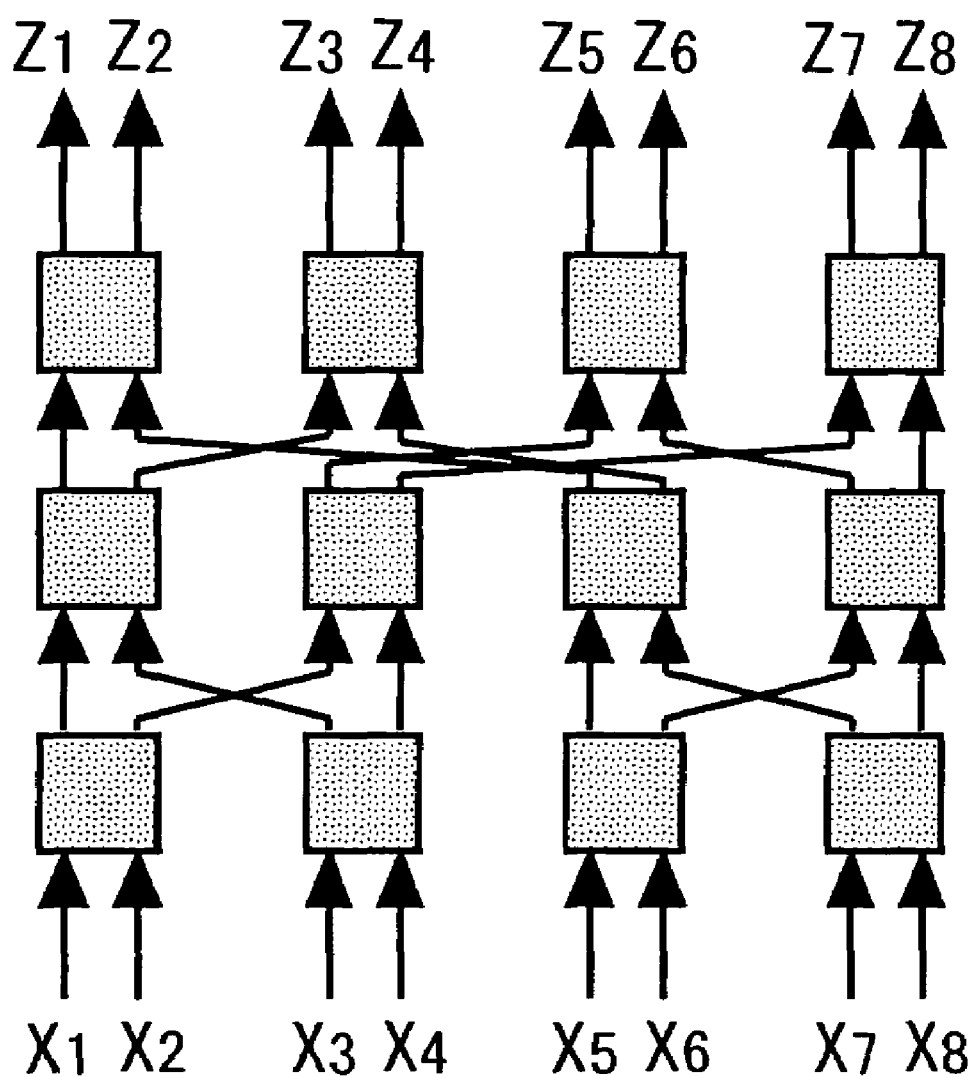
 : CROSSBAR SWITCH BLOCK

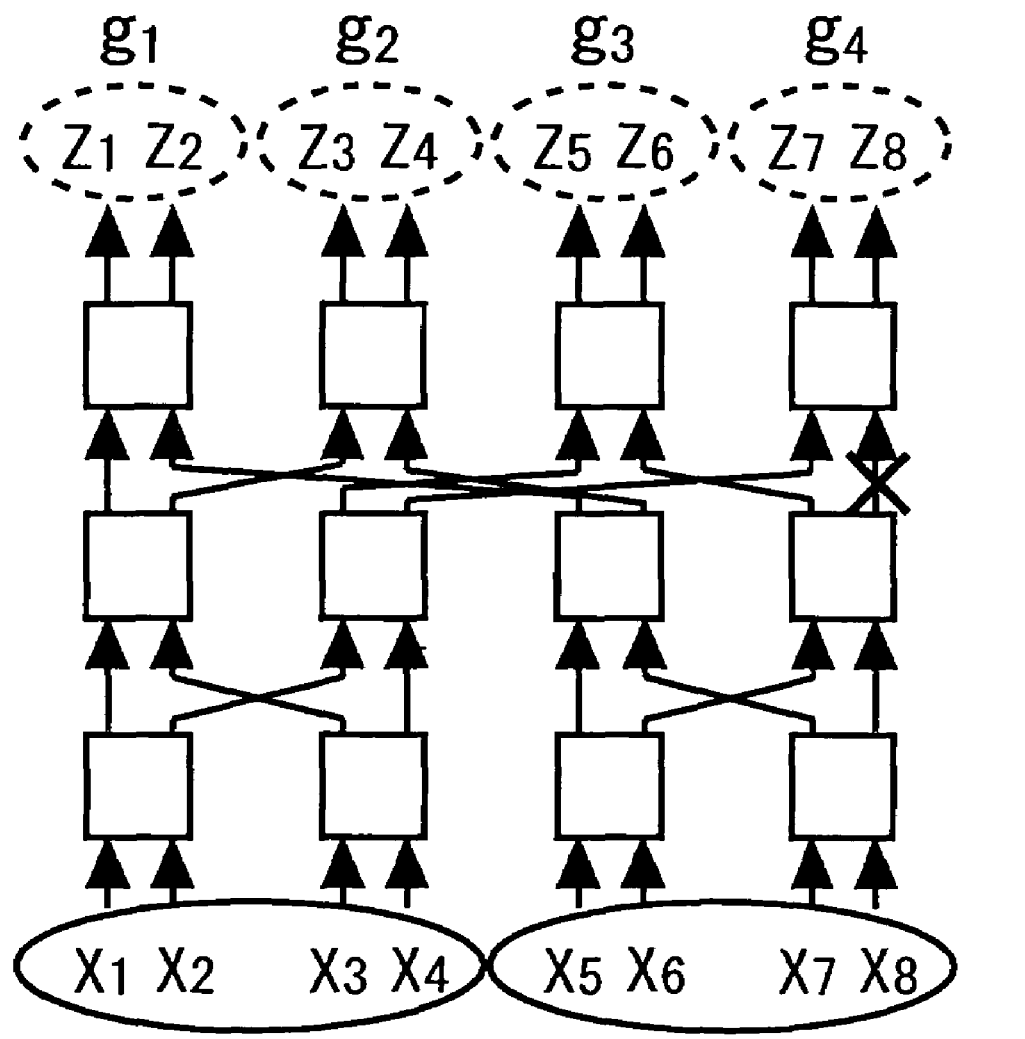

INPUT TERMINALS ENCIRCLED WITH ◯
ARE UNABLE TO SIMULTANEOUSLY CONNECT
DIFFERENT OUTPUTS ENCIRCLED WITH ⊂⊃

FIG. 8

| INPUT TERMINAL OF PE1 | INPUT TERMINAL OF PE2 | DISTANCE |
|---|---|---|
| (g1, g3) | (g1, g3) | 8 |
| (g1, g3) | (g1, g4) | 6 |
| (g1, g3) | (g2, g3) | 6 |
| (g1, g3) | (g2, g4) | 4 |
| (g1, g4) | (g1, g4) | 8 |
| (g1, g4) | (g2, g3) | 4 |
| (g1, g4) | (g2, g4) | 6 |
| (g2, g3) | (g2, g3) | 8 |
| (g2, g3) | (g2, g4) | 6 |
| (g2, g4) | (g2, g4) | 8 |

FIG. 12

| NETWORK STRUCTURE | IMPLEMENTABLE COMBINATION | RATE TO WHOLE COMBINATIONS |
|---|---|---|
| COMPATIBILITY UNCONSIDERED (FIG. 10) | 2,156,480 | 12.9% |
| SWITCHOVER OF PE INPUT (FIG. 7) | 3,331,456 | 19.9% |
| CONNECTION BASED ON PROPOSAL METHOD (FIG. 9) | 10,537,800 | 62.8% |

FIG. 14B

|       | G1, G2 | G1, G3 | G1, G4 | G2, G3 | G2, G4 | G3, G4 |
|-------|--------|--------|--------|--------|--------|--------|
| G1, G2 | 8 | 4 | 4 | 4 | 4 | 0 |
| G1, G3 | 4 | 8 | 4 | 4 | 0 | 4 |
| G1, G4 | 4 | 4 | 8 | 0 | 4 | 4 |
| G2, G3 | 4 | 4 | 0 | 8 | 4 | 4 |
| G2, G4 | 4 | 0 | 4 | 4 | 8 | 4 |
| G3, G4 | 0 | 4 | 4 | 4 | 4 | 8 |

FIG. 15

|  | G1 | G2 | G3 | G4 |
|---|---|---|---|---|
| gx0 | R1-1 | R1-2 | R1-3 | R1-4 |
|  | RAM1-A | MUL3-B | MUL2-B | RAM4-B |
|  | ALU1-A | ALU8-A | ALU6-A | ALU3-B |
|  | ALU9-A | E02 | ALU13-B | ALU12-B |
| gx1 | R2-1 | R2-2 | R2-3 | R2-4 |
|  | RAM3-A | RAM1-B | MUL4-A | MUL1-B |
|  | ALU3-A | ALU2-A | ALU7-B | ALU6-B |
|  | ALU11-A | ALU10-A | E03 | ALU14-B |
| gx2 | R3-1 | R3-2 | R3-3 | R3-4 |
|  | MUL1-A | RAM4-A | RAM2-A | MUL4-B |
|  | ALU5-A | ALU4-A | ALU1-B | ALU8-B |
|  | ALU13-A | ALU11-B | ALU10-B | E04 |
| gx4 | R4-1 | R4-2 | R4-3 | R4-4 |
|  | MUL3-A | MUL2-A | RAM3-B | RAM2-B |
|  | ALU7-A | ALU5-B | ALU4-B | ALU2-B |
|  | E01 | ALU14-A | ALU12-A | ALU9-B |

US 7,391,234 B2

CIRCUIT AND CIRCUIT CONNECTING METHOD

BACKGROUND OF THE INVENTION

The invention related to a network technology for connecting operation elements.

A coarse grain reconfigurable circuit is configured by a plurality of processing elements (PEs) having a variety of functions and an internal connecting network that connects the PEs, and actualizes a data transfer between the arbitrary processing elements by changing connection information for setting paths of the internal connecting network. Herein, the "coarse grade" implies a reconfigurable circuit built up between the processing elements in which a basic instruction is operation on a word-by-word basis.

An ideal network is a network that can set an arbitrary data path and has a small number of circuits to be used and a small number of circuit stages of the path. And a variety of networks are proposed. The network in which the path exists for every output destination from an arbitrarily selected input source is classified into (1) a blocking network, wherein in the case of setting a certain path, this path setting hinders other paths, i.e., connections between the output destination and other input sources through other paths are blocked, and (2) a non-blocking network, wherein in the case of setting a certain path, this path setting does not hinder other paths, i.e., the connections through other paths are not blocked. In the reconfigurable circuit, signals are outputted simultaneously from a plurality of elements, and hence the non-blocking network is ideal in terms of the data transfer.

The non-blocking network, however, requires a great number of wirings, and therefore the circuit gets into a large scale. For example, an n-input/n-output network needs switches of $n^2$ in a crossbar switch network.

FIG. 1 shows an example of 3-stage Clos network defined as one of the non-blocking networks. The 3-stage Clos network shown in FIG. 1 requires switches of $3n^{1.5}$. In FIG. 1, eight tuples of 8-input/8-output crossbar switch blocks are formed per stage, and thus the 8-tuple crossbar switch blocks are provided at three stages.

In this case, an input count (the number of inputs) n=64, and an output count (the number of inputs) n=64, and therefore $n^{0.5}$=8. A switch count (the number of switches) of the one crossbar switch block is given by $8 \times 8 = n^{0.5} \times n^{0.5}$, and these crossbar switch blocks are provided by 3 stages×8 tuples=$3 \times n^{0.5}$. Accordingly, to generalize FIG. 1, the switch count becomes $3n^{1.5}$.

Generally, in the blocking network, the circuit can be downsized, and, in typical networks such as an omega network and a baseline network, the circuit can be actualized on a circuit scale on the order of $2n \cdot \log(n)$, however, some paths that can not be actualized simultaneously occur because of there being some paths blocked by setting one path.

[Patent document 1] Japanese Examined Patent Publication No. 7-71353
[Patent document 2] Japanese Patent Publication No. 2786246

SUMMARY OF THE INVENTION

As to the coarse grain reconfigurable circuit, its downsizing is an important subjects and the blocking network is desirable in terms of an area size. In the case of applying the blocking network, however, the types of the processing elements to be connected are different in the coarse grain reconfigurable circuit, and hence there comes out a process unable to be actualized by one structure, depending on how the processing elements are combined. The occurrence of the process that can not be actualized is called a blocking characteristic.

Considered, for instance, is an 8-input/8-output indirect binary 3-cube network (which will hereinafter be abbreviated to IB3C network) defined as one of the basic clocking networks (see FIG. 2).

The network in FIG. 2 has two blocking characteristics. Herein, each of the crossbar switch blocks configuring the network is capable of setting three types of connections (straight, cross and branch) as in FIGS. 3A through 3D.

The first blocking characteristic pays attention to each of the crossbar switch blocks that form the third stage (which is the uppermost row of crossbar switch blocks in FIG. 2) of the circuit in FIG. 2. Two pieces of output terminals (a tuple of $Z_1$ and $Z_2$, a tuple of $Z_3$ and $Z_4$, a tuple of $Z_5$ and $Z_6$, and a tuple of $Z_7$ and $Z_8$ in FIG. 2) of each of the crossbar switch blocks at the third stage, can not be simultaneously connected to different two network input terminals in a network input terminal tuple (a tuple of $X_1$-$X_4$ or a tuple of $X_5$-$X_7$ in FIG. 2) connected tracing back from one of the input terminals of the crossbar switch block at the third stage (see FIG. 4A). To be specific, in FIG. 4A, the output terminals $Z_7$, $Z_8$ can not be simultaneously connected to the input terminals $X_5$-$X_8$ linking to the input terminal marked with "X".

The second blocking characteristic pays attention to each of the crossbar switch blocks configuring the first stage (which is the lowermost row of crossbar switch blocks in FIG. 2). A tuple of output terminals (a tuple of $Z_1$ through $Z_4$ or a tuple of $Z_5$ through $Z_8$ in FIG. 2) at the third stage reachable from one output terminal of each of the crossbar switch blocks at the first stage, can not be simultaneously connected to different two input terminals (each of a tuple of $X_1$ and $X_2$, a tuple of $X_3$ and $X_4$, a tuple of $X_5$ and $X_6$, and a tuple of $X_7$ and $X_8$ in FIG. 2) of the crossbar switch blocks at the first stage (FIG. 4B). Namely, in FIG. 4B, the input terminals X1, X2 can not be simultaneously connected to the tuples of output terminals $Z_1$ through $Z_4$ at the third stage that are linked to the output terminals marked with "x".

Therefore, supposing that a circuit structure as in FIGS. 4A, 4B is built up by applying the IB3C network in FIG. 2 in an internal network of the reconfigurable circuit (see FIG. 5) constructed of two multipliers, two adders, two registers and two external inputs, when implementing the application as in FIG. 6, path blocking occurs in two paths such as a path extending from the external input 2 up to the multiplier and a path from the multiplier up to the adder, and consequently the implementation can not be done (see FIG. 7).

The invention proposes a circuit configuration contrived to reduce the blocking characteristics to the greatest possible degree in the reconfigurable circuit utilizing the blocking network. It is an object of the invention to enable as many applications as possible to be implemented by such a circuit.

The invention adopts the following means in order to solve the problems. Namely, the invention is a circuit including one or more operation elements executing numerical value operation or a logical operation for digital data to be inputted and outputting output signals of the numerical value operation or the logical operation. The circuit includes network output terminals connected to an input side of the operation elements, network input terminals to which the output signals of the operation elements or external signals other than the output signals of the operation elements are inputted. Further, the circuit includes a network structure connecting the network input terminals to the network output terminals. The network structure configures a blocking network where there exists constraint against such a combination of said network input terminal and said network output terminal as to make it unfeasible to further connect, when connecting the first network input terminals to said first network output terminals, the second network input terminals to any one of the second network output terminals. Then, according to the invention, the operation elements and the network output terminals are connected so as to minimize a constraint strength between the plurality of network output terminals for inputting to the same operation element with respect to the constraint strength defined as the number of network input terminals contained in tuples of network input terminals to which the two network output terminals in the network output terminals can not be simultaneously connected.

In the circuit, the operation elements and the network output terminals may further be connected so as to minimize the constraint strength between the network output terminals connected to the plurality of operation elements logically having compatibility in the operation elements.

According to the invention, in the circuit utilizing the blocking network, a larger number of applications than by the prior arts can be implemented.

BRIEF DESCRIPTION OF THE DRAWINGS

FIG. 2 is an example of an 8-input/8-output indirect binary 3-cube network;

FIGS. 4A, 4B are examples of a blocking characteristic.

FIG. 8 is an example of calculating a distance between processing elements in the case of a first embodiment;

FIG. 12 is an example of a result of calculating the implementation rate;

FIGS. 14A-14B are diagrams showing a minimum distance between the processing elements;

FIG. 15 is an example of assigning the processing elements to the 64-input/64-output indirect binary 3-cube network using 4-input/4-output crossbar switches;

DETAILED DESCRIPTION OF THE INVENTION

Figure 1:
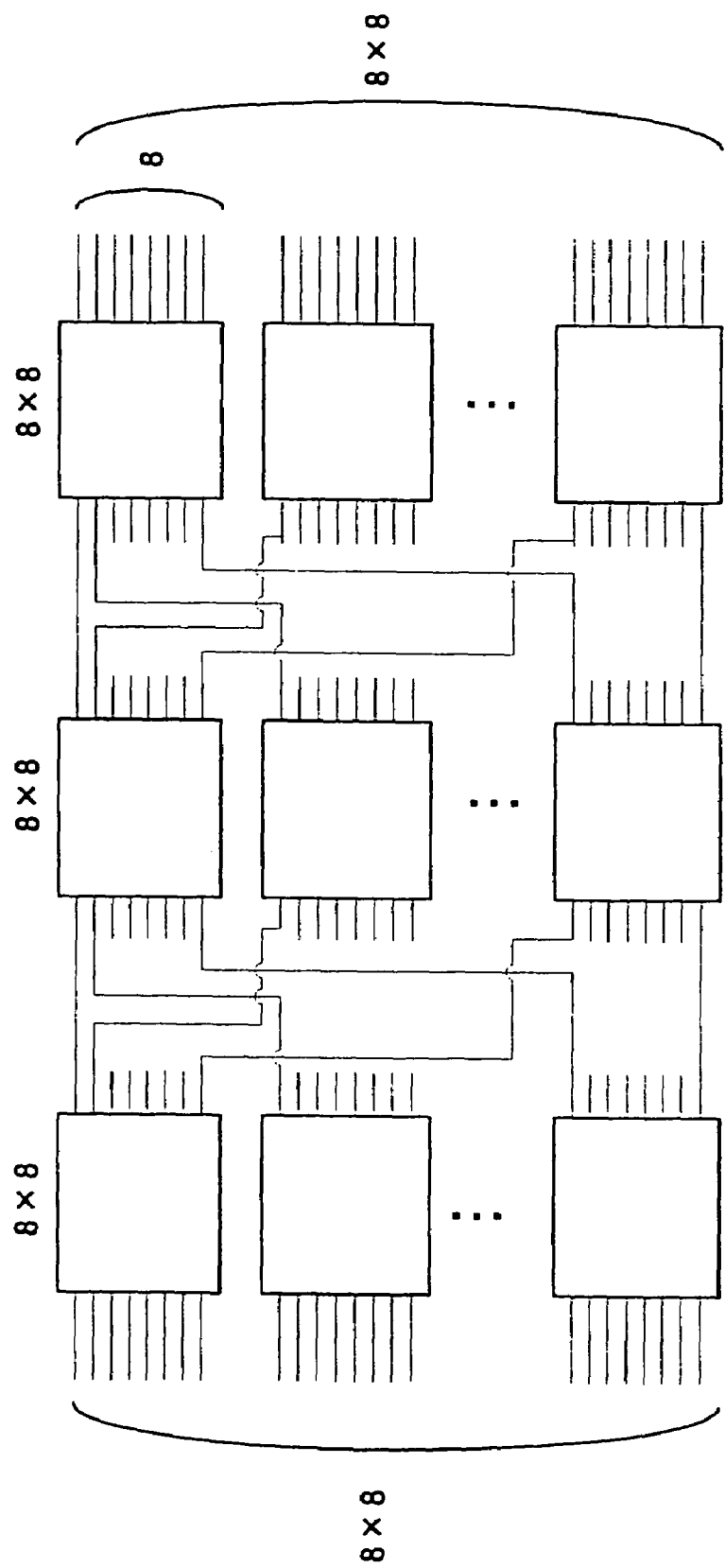
FIG. 1. is an example of a Clos network at three stage.
Figure 3A:
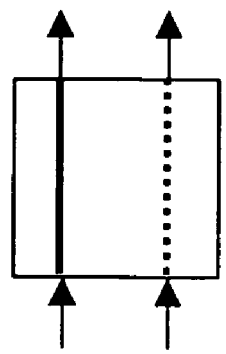
FIGS. 3A-3D are connection setting examples of crossbar switch blocks.
Figure 3B:
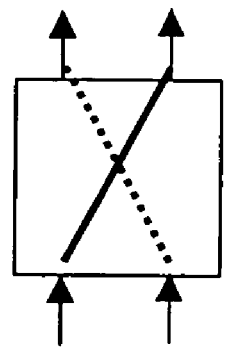
Figure 3C:
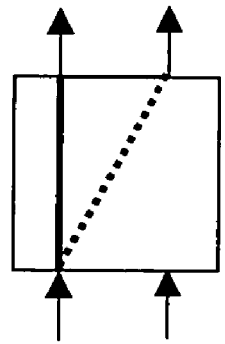
Figure 3D:
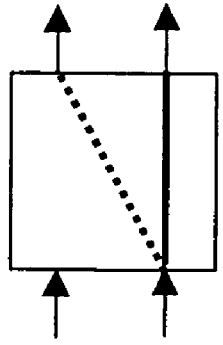

A reconfigurable circuit according to a best mode (which will hereinafter be termed an embodiment) for carrying out the invention will hereinafter be described with reference to the drawings. A configuration in the following embodiment is an exemplification, and the invention is not limited to the configuration in the embodiment.

Substance of the Invention

The reconfigurable circuit assumes plural types of processing elements having no compatibility (corresponding to an operation element according to the invention). Such being the case, the embodiment proposes a circuit structure expanding objects of applications that can be implemented when using the circuit structure by establishing a connection in a basic blocking network in consideration of a logical compatibility between the inputs of the processing elements and a logical compatibility between the processing elements. Herein, the basic blocking network is assumed to be configured by 3-stage crossbar switch blocks having n×m switches (which are hereinafter simply called switch blocks), such as a baseline network and a 3-cube network.

In the reconfigurable circuit, when expressing strength of constraint between two terminals as a distance, processing elements are connected to accomplish the following two evaluation criteria.

(Evaluation Criterion 1) Processing elements are connected to minimize the distance between the input terminals of respective processing elements. Note that there is a case of making a calculation by use of the network-side output terminals which are connected to the input terminals in place of the input terminals of respective processing elements in the embodiment. In this case, the evaluation criterion 1 can be expressed in different words such as "processing elements are connected to minimize the distance between the network-side output terminals connected to the input terminals of respective processing elements". Namely, in the embodiment, the input terminals of respective processing elements and the network-side output terminals connected to the input terminals are treated as being equivalent.

(Evaluation Criterion 2) Compatible processing elements are connected to minimize the distance between the input terminals of the processing elements. This evaluation criterion 2 can be expressed in different words such as "compatible processing elements are connected to minimize the distance between the network-side output terminals connected to the input terminals of the processing elements".

Herein, a distance $LT(i, j)$ representing strength of the constraint of output terminals (or input terminals of the processing elements connected to these output terminals) $Ti$ and $Tj$ of the two switch blocks at the final stage, is defined as follows. The distance $LT(i, j)$ corresponds to constraint strength according to the invention.

$LT(i, j)$=an input terminal count (the number of input terminals) of the network which two output terminals, $Ti$ and $Tj$, can not be connected to simultaneously;

Further, a distance $LT(k, l)$ between two processing elements, $Pk$ and $Pl$, is defined as below.

$$LP(k, l) = \Sigma LT(i, j);$$

$Pk \ni$ a connecting destination of $Ti$;
$Pl \ni$ a connecting destination of $Tj$;

Pk, Pl: operation elements
Ti, Tj: network output terminals

To express the previous evaluation criteria 1 and 2 by these definitions, it follows that connections are established to minimize the following two functions. Priority levels are set in the sequence from the highest.

| | |
|---|---|
| F1 ( ) = Σ ( | ΣLT(i, j)); |
| k is an index of each operation element; | Pk ∋ the connecting destination of Ti, Tj; |
| F2 ( ) = Σ ( | ΣLP(k, l)); |
| All types of the operation elements; | Pk, Pl are the same type of operation elements; |

First Embodiment

The 8-input/8-output indirect binary 3-cube network in FIG. 2 is exemplified by way of a working example. In this network, the terminal-to-terminal distance is given as follows.

LT(i,j)=4; (a case where Ti and Tj are the output terminals of the same crossbar switch block at the third stage in FIG. 2)

LT(i,j)=2; (a case where Ti and Tj which are output terminals of the crossbar switch block at the third stage are reachable from one output terminal of a crossbar switch block at the first stage in FIG. 2);

LT(i,j)=0 (a case other than the above)

Considered is a case of connecting two pieces of adders (2-inputs/1-output), two pieces of multipliers (2-inputs/1-output), two pieces of external inputs and two pieces of registers by employing the basic blocking network described above.

Now, in FIG. 2, let G1 be an output terminal group of Z1 through Z4, and let G2 be an output terminal group of Z5 through Z8. According to the evaluation criterion 1, for minimizing the function F1, it is preferable that the respective input terminals of the adders and of the multipliers are grouped differently.

Figure 4B:
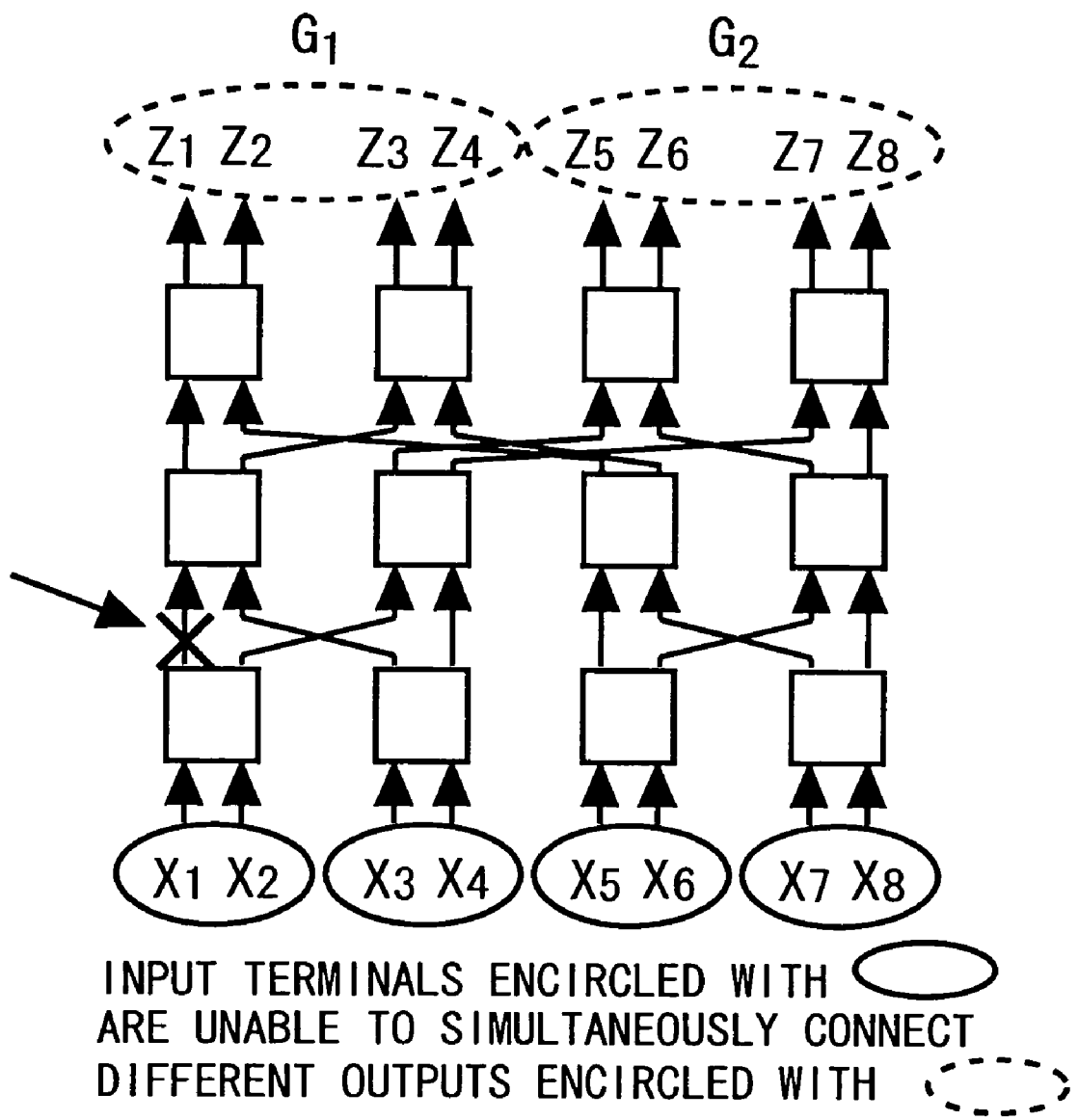
Figure 5:
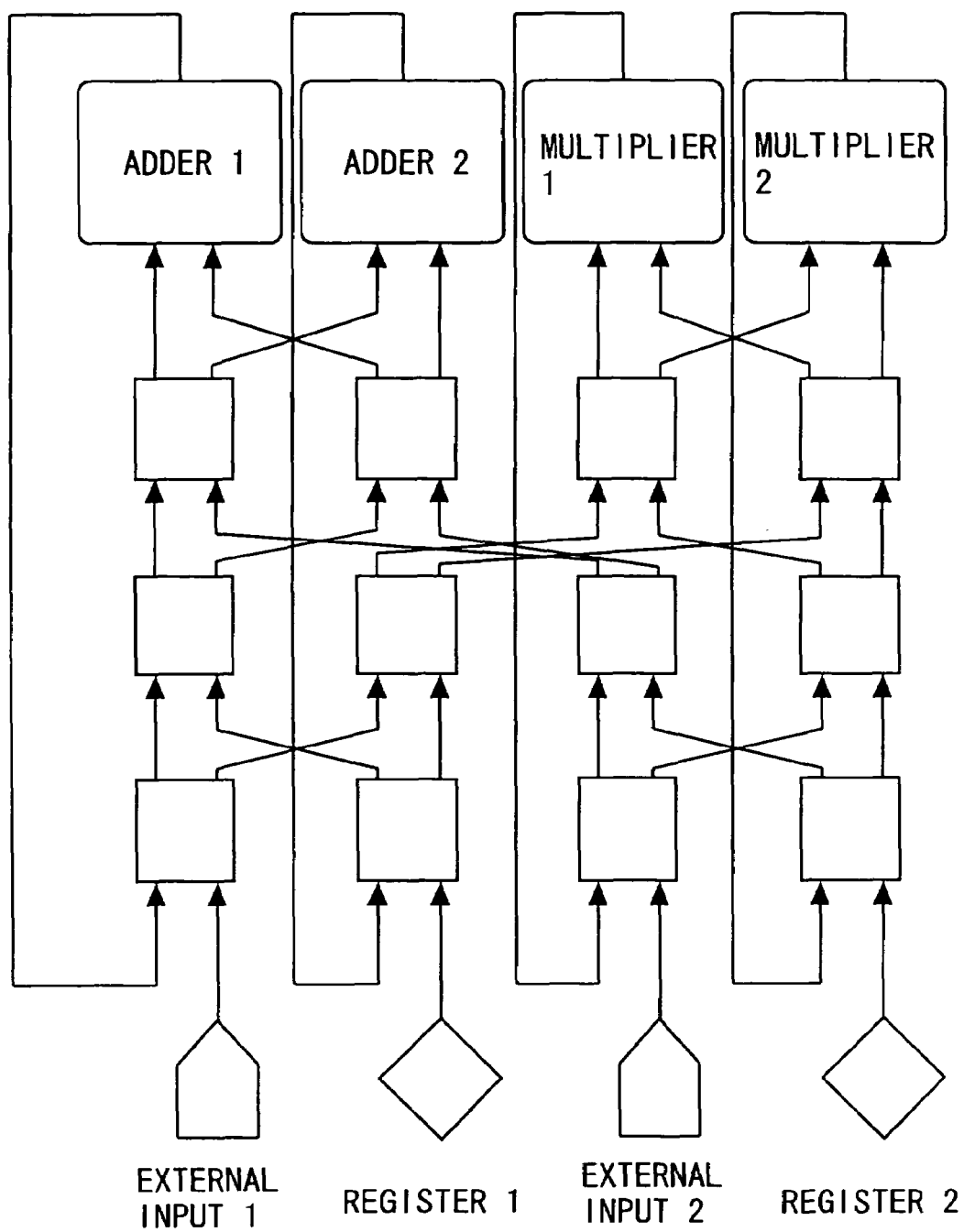
FIG. 5 is an example of a reconfigurable circuit to which the indirect binary 3-cube network is applied.
Figure 6:
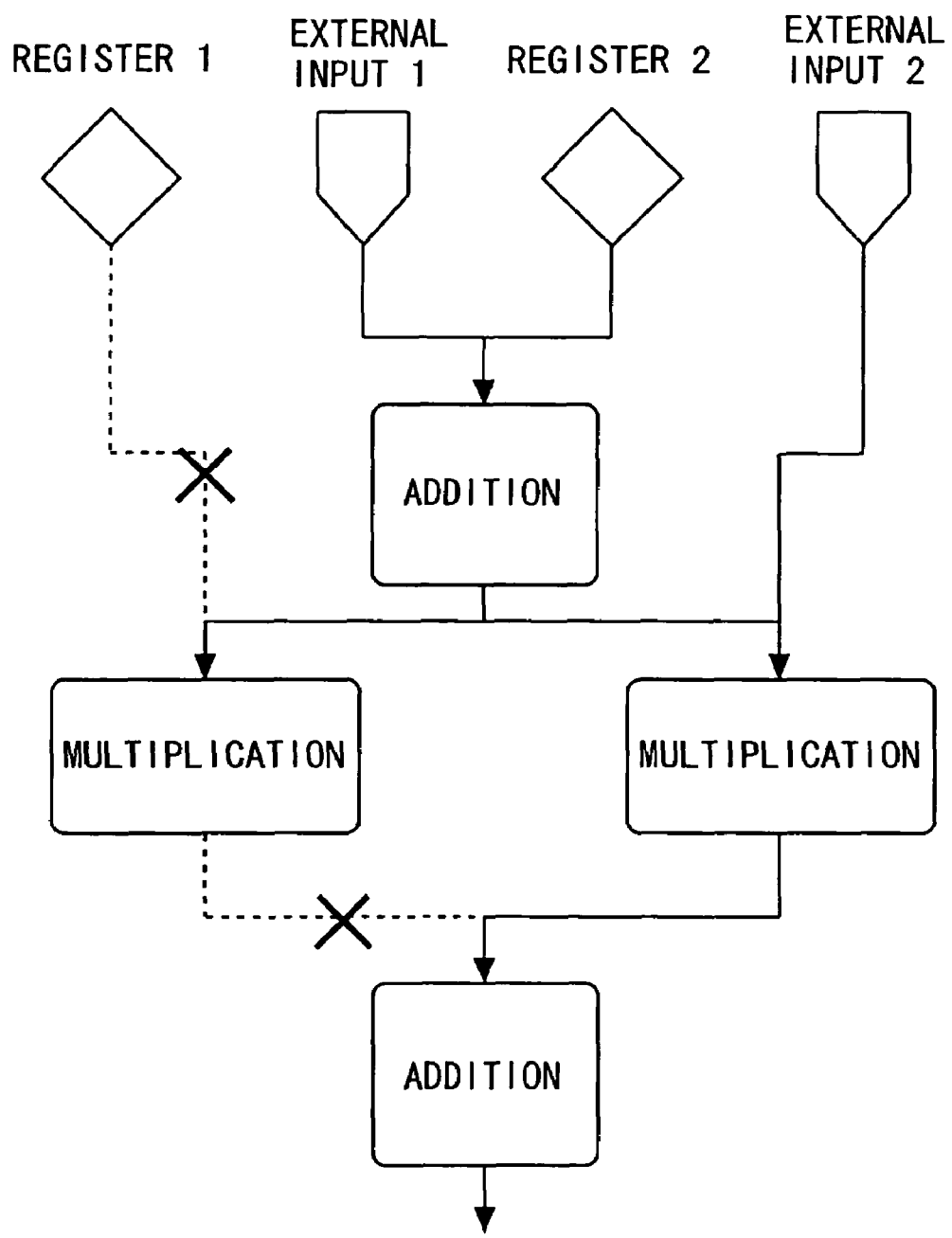
FIG. 6 is an example of the blocking characteristic in an application.

The reason why so is that as shown in FIG. 4B, for example, if the two input terminals Ti, Tj of one adder are assigned to G1, G2 respectively, the distance between these two input terminals comes to 0. Similarly, if the two input terminals Ti, Tj of one multiplier are assigned to G1, G2 respectively, the distance between these two input terminals comes to 0.

Accordingly, in this example, the four input terminals (any ones of the input terminals Ti, Tj of each of the four processing elements) are assigned to G1, and the four input terminals (the others of the input terminals Ti, Tj of each of the four processing elements) are assigned to G2. In this case, F1() is 0.

Next, to classify the output terminals, $Z_1$ and $Z_2$ are grouped as g1, $Z_3$ and $Z_4$ are grouped as g2, $Z_5$ and $Z_6$ are grouped as g3 and $Z_7$ and $Z_8$ are grouped as g4, respectively (see FIG. 4A).

In the combinations of the groups to which the input terminals (Ti, Tj) of the 2-input/1-output processing elements are connected, the combinations of minimizing the distance between the input terminals of the same processing element are (g1, g3), (g1, g4), (g2, g3) and (g2, g4).

Further, according to the evaluation criterion 2, the application of the input terminals of the 2-input/1-output processing elements proceeds. Now, supposing that the two processing elements are connected according to any one of the above combinations, a distance between these two processing elements is given as in FIG. 8. In FIG. 8, for instance, PE1 is the first adder, and PE2 is the second adder. Alternatively, PE1 is the first multiplier, and PE2 is the second multiplier.

Accordingly, if the inputs of the two adders (and the two multipliers) are set to (g1, g3) and (g2, g4) or to (g1, g4) and (g2, g3), a sum of the distances between the input terminals of the two adders becomes 4, and a sum of the distances between the input terminals of the two multipliers becomes 4.

Next, a ratio (which will hereinafter be termed an implementation rate) of the applications that can be implemented by the network set in these procedures, is to be obtained. Obtained herein is the implementation rate in the case of assigning eight output signals with respect to the outputs to which the two multipliers and the two adders are connected.

It is to be noted that in the network in FIG. 2, on the assumption that the signals inputted to the respective input terminals (X1-X8) are to be inputted to the input terminals of any of the processing elements, and its combinations are given by $8^8 = 16777216$ ways.

Figure 9:
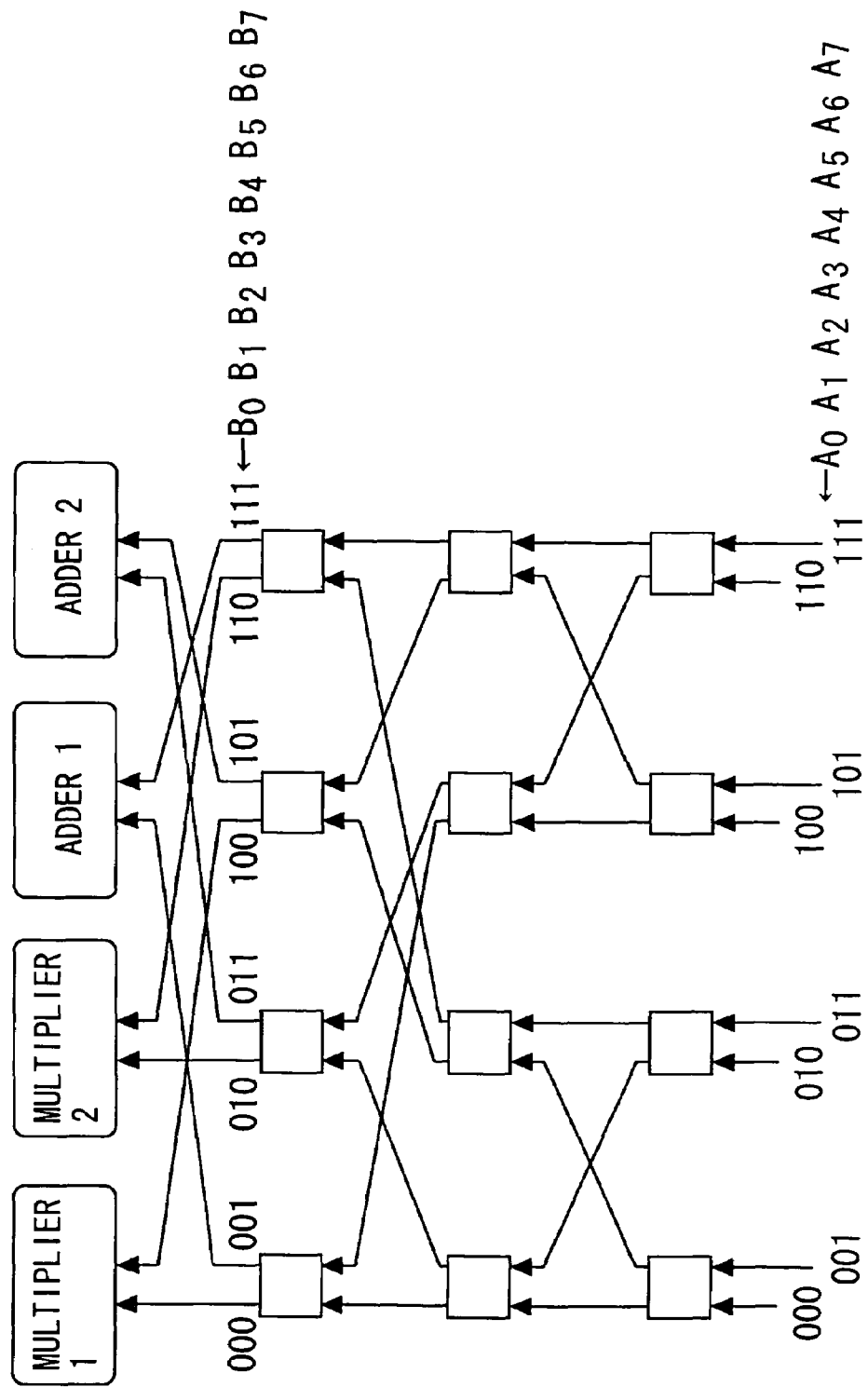
FIG. 9 is an example of the indirect binary 3-cube network taking account of compatibility between the processing elements.
Figure 10:
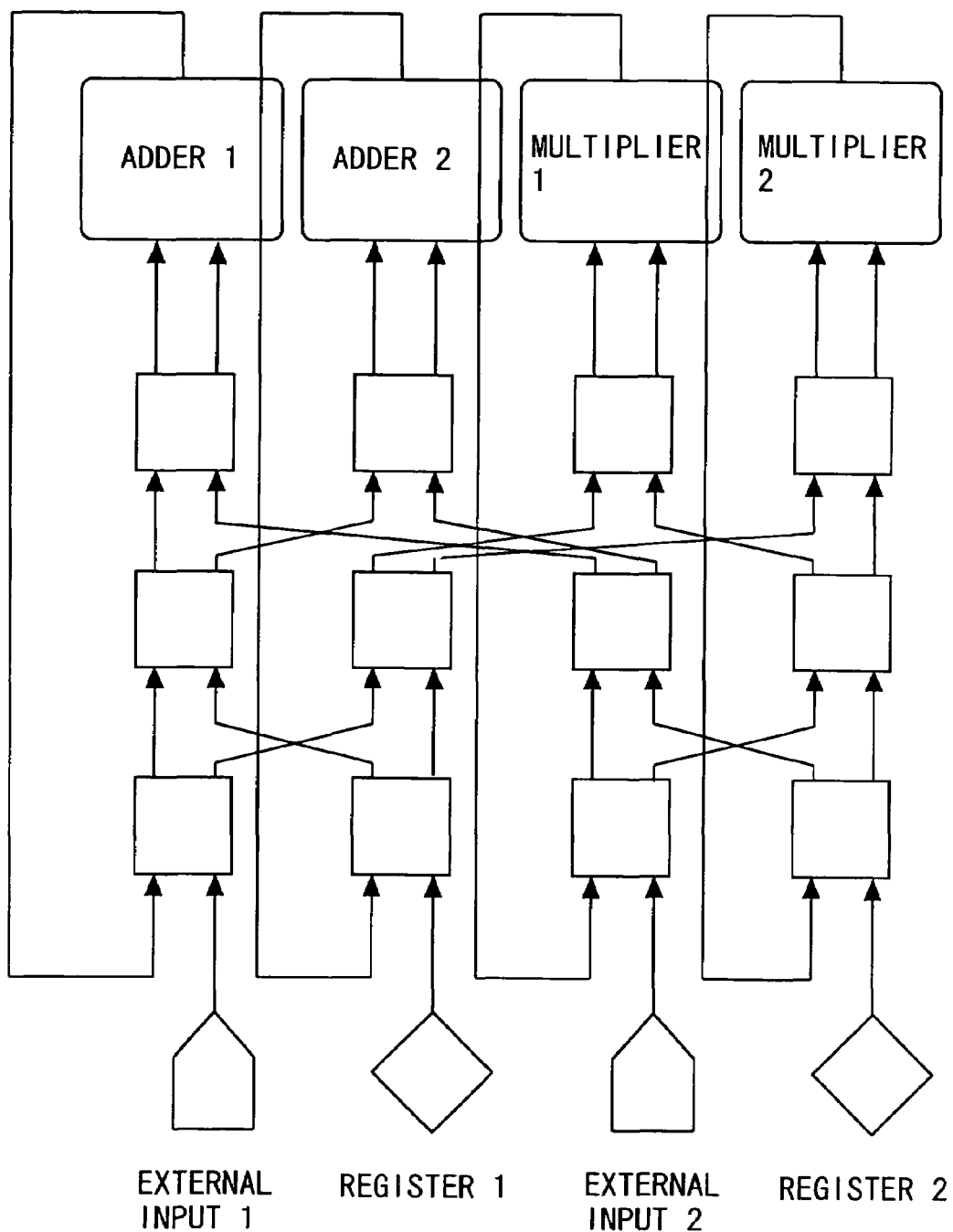
FIG. 10 is an example of the indirect binary 3-cube network taking account of none of the compatibility between the processing elements.

FIG. 9 shows an example of a network configuration in the embodiment. Further, FIG. 10 illustrates an example of a network connection that does not take account of terminal-to-terminal dependency, i.e., does not take the (Evaluation Criterion 1) and (Evaluation Criterion 2) into consideration.

As shown in FIG. 9, pieces of 3-bit identifying information "000 through 111" are assigned to the respective input terminals. Moreover, pieces of 3-bit identifying information "000 through 111" are assigned to the respective output terminals.

Herein, an input terminal number, an output terminal number and a network pattern are defined as below.

$A_k$ (k=0 through 7): Input terminal number expressed in 3 bits and given by 000 through 111 in FIG. 9.

$B_k$ (k=0 through 7): Output terminal number expressed in 3 bits and given by 000 through 111 in FIG. 9.

$P_k$ (k=0 through 7): Numerical value expression of the network pattern that is expressed in 24 bits. Three (3) bits "$p_{3k+2}p_{3k+1}p_{3k}$" of a (3k)-th bit through a (3k+2)-th bit of $P_k$ represent the terminal number of the input terminal connected to the output terminal $B_k$. Herein, "k" is a number representing a bit position for every 3 bits.

Figure 11:
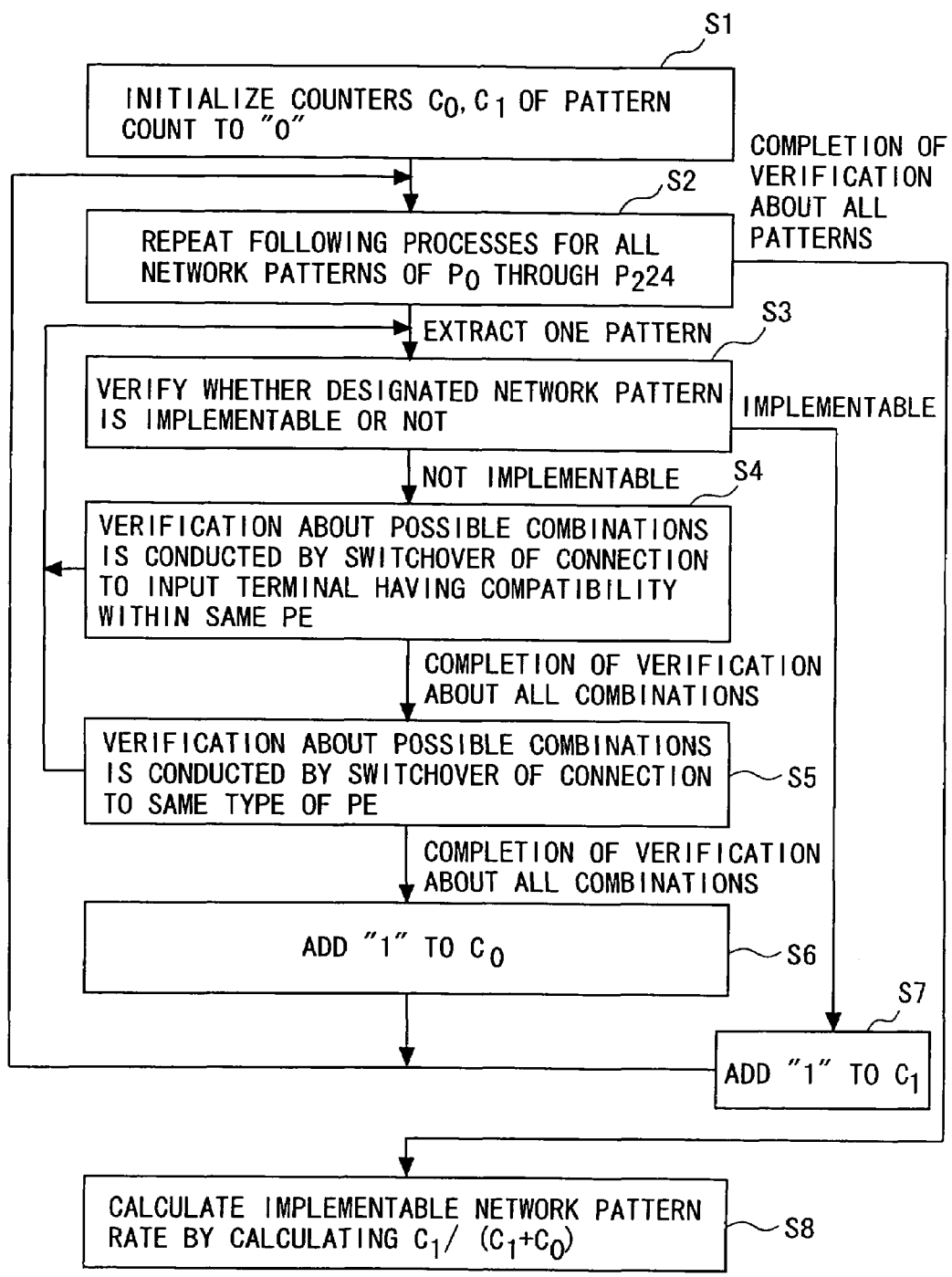
FIG. 11 is a flowchart showing processes of a calculation program for calculating an implementation rate on a circuit.

A process of a calculation program for calculating an implementation rate on the circuit that connects the two multipliers and the two adders to the output terminals, will be explained with respect to the definitions of those output terminals and input terminals. This program is executable by a general type of computer including a CPU, a memory, a display means (a display), input means (a keyboard, a mouse, etc.) and so on. FIG. 11 shows a flowchart of the calculation program.

At first, the computer initializes, to 0, $C_0$ indicating a not-implemented network pattern count and $C_1$ showing an implementable network pattern count (S1).

The computer sequentially selects one of 16777216 (=$2^{24}$) ways of network patterns (S2), and verifies its implementability (S3). To begin with, an assumption is that $P_0 = 00000000_{(8)}$ (a suffix (8) represents an octal number) be selected. This is a pattern for connecting the input terminal having a number "$0_{(8)} = 000_{(2)}$" to all the output terminals. Verification of the implementability is checked according to two blocking rules that follow.

(Blocking Rule 1) With respect to the input terminal $p_{3k+2}p_{3k+1}p_{3k}$ connected to $B_k$ and the input terminal $p_{3k+5}p_{3k+4}p_{3k+3}$ connected to $B_{k+1}$ (k=2i), if the upper bits, $p_{3k+2}$ and $p_{3k+5}$, are the same but the lower 2-bits numbers, $p_{3k+1}p_{3k}$ and $p_{3k+4}p_{3k+3}$, are different, the implementation can not be done.

This rule is what expresses with a bit pattern of a network input terminal for being connected to the output terminal $B_k$, the first blocking characteristic "two pieces of output terminals (a tuple of $Z_1$ and $Z_2$, a tuple of $Z_3$ and $Z_4$, a tuple of $Z_5$ and $Z_6$, and a tuple of $Z_7$ and $Z_8$ in FIG. 2) of each of the switch blocks at the third stage, can not be simultaneously connected to different two network input terminals in a network input terminal tuple (a tuple of $X_1$-$X_4$ or a tuple of $X_5$-$X_7$ in FIG. 2) connected to one of the input terminals of the switch block at the third stage" shown in FIG. 4(A).

(Blocking Rule 2)In the input terminals $p_{3k+2}p_{3k+1}p_{3k}$, $p_{3k+5}p_{3k+4}p_{3k+3}$, $p_{3k+8}p_{3k+7}p_{3k+6}$ and $p_{3k+11}p_{3k+10}p_{3k+9}$ that are connected to $B_k$, $B_{k+1}$, $B_{k+2}$ and $B_{k+3}$ (k=4i), if such bit patterns among the above 4 bit patterns exists that the upper 2-bits numbers are the same but the lowest bits are different, the implementation can not be done.

This rule is what expresses with a bit pattern of a network input terminal for being connected to the output terminals $B_k$, $B_{k+1}$, $B_{k+2}$ and $B_{k+3}$, the second blocking characteristic "a tuple of output terminals (a tuple of $Z_1$ through $Z_4$ or a tuple of $Z_5$ through $Z_8$ in FIG. 2) at the third stage that is connected one output terminal of each of the switch blocks at the first stage, can not be simultaneously connected to different two input terminals (each of a tuple of $Z_1$ and $Z_2$, a tuple of $Z_3$ and $Z_4$, a tuple of $Z_5$ and $Z_6$, and a tuple of $Z_7$ and $Z_8$ in FIG. 2) of the switch blocks at the first stage" shown in FIG. 4B.

Through this verification, if applied to neither the blocking rule 1 nor the blocking rule 2, the computer judges it to be implementable. This being the case, the computer increments $C_1$ representing the implementable network pattern count (S7).

Whereas if applied to any one of the blocking rule 1 and the blocking rule 2, the computer switches the connection over to the input terminal, having the compatibility, of the same processing element (S4), and re-executes the verification once again based on the blocking rule 1 and the blocking rule 2 (S3). This is because of obviating the blocking characteristic by switching the network-side output terminal over to the input terminal of the same processing element and of there being a case where the application, which could not be implemented, becomes implementable. Thus, if the application is judged to be implementable, the computer proceeds with the processing to S7.

On the other hand, when the verification about all the exchangeable combinations is thus finished, the computer judges the application not to be implementable by switching over how the network-side output terminal to the input terminal of the same processing element. Then, the computer proceeds with the processing to S5.

The computer exchanges implemented processes between processing elements with the same type (e.g., between the adder 1 and the adder 2, and between the multiplier 1 and the multiplier 2, etc) (S5), and re-executes the verification once again based on the blocking rule 1 and the blocking rule 2 (S3). This is because of obviating the blocking characteristic by switching the network-side output terminal over to the input terminal of the same type of processing element and of there being a case where the application, which could not be implemented, becomes implementable. Thus, if the application is judged to be implementable, the computer proceeds with the processing to S7.

On the other hand, when the verification about all the exchangeable combinations is thus finished, the computer judges the application not to be implementable by switching over how the network-side output terminal to the input terminal of the same type of processing element. Then, the computer proceeds with the processing to S6. The computer increments $C_0$ representing the not-implemented network pattern count (S6).

For example, a pattern of $P_0=00000000_{(8)}$ has no combination applied to the two blocking rules, and therefore becomes implementable. By contrast, in a pattern of $P_{4196672}=10004500_{(8)}$, the input terminals connecting to $B_4$ and $B_5$ are $4=100_{(2)}$ and $5=101_{(2)}$, which is applied to the blocking rule 1, so that this pattern can not be implemented. In FIG. 9, however, $B_0$ and $B_4$ are the input terminals of the multiplier 1, and hence the pattern can be implemented. Such being the case, when verifying the implementability once again by executing "the switchover of the connection to the input terminal with the compatibility of the same processing element" in the flowchart, it proves to be implementable. The reason why so is that combination of the input terminals connected to $B_0$ and $B_5$, "$1=001_{(2)}$" and "$5=101_{(2)}$", don't corresponds to the blocking rule 1. It is understood from this point that the circuit having the compatibility with $P_{4196672}=10004500_{(8)}$ can be implemented.

After thus conducting the verification about all the patterns, the computer divides the implementable pattern count by a whole network pattern count ($8^8=16777216$) (S8). Through the processes given above, the implementation rate on the circuit, which uses the given operators, can be calculated.

FIG. 12 shows a result of obtaining the implementation rate for each of systems. This numerical value is obtained by the computer program that executes the processing in FIG. 11. In FIG. 12, "compatibility unconsidered" implies a case of establishing the connection without taking account of none of the compatibility between the terminals of the processing elements and the compatibility between processing elements of the same type, and namely the implementation rate in the network in FIG. 10 is given therein.

Figure 7:
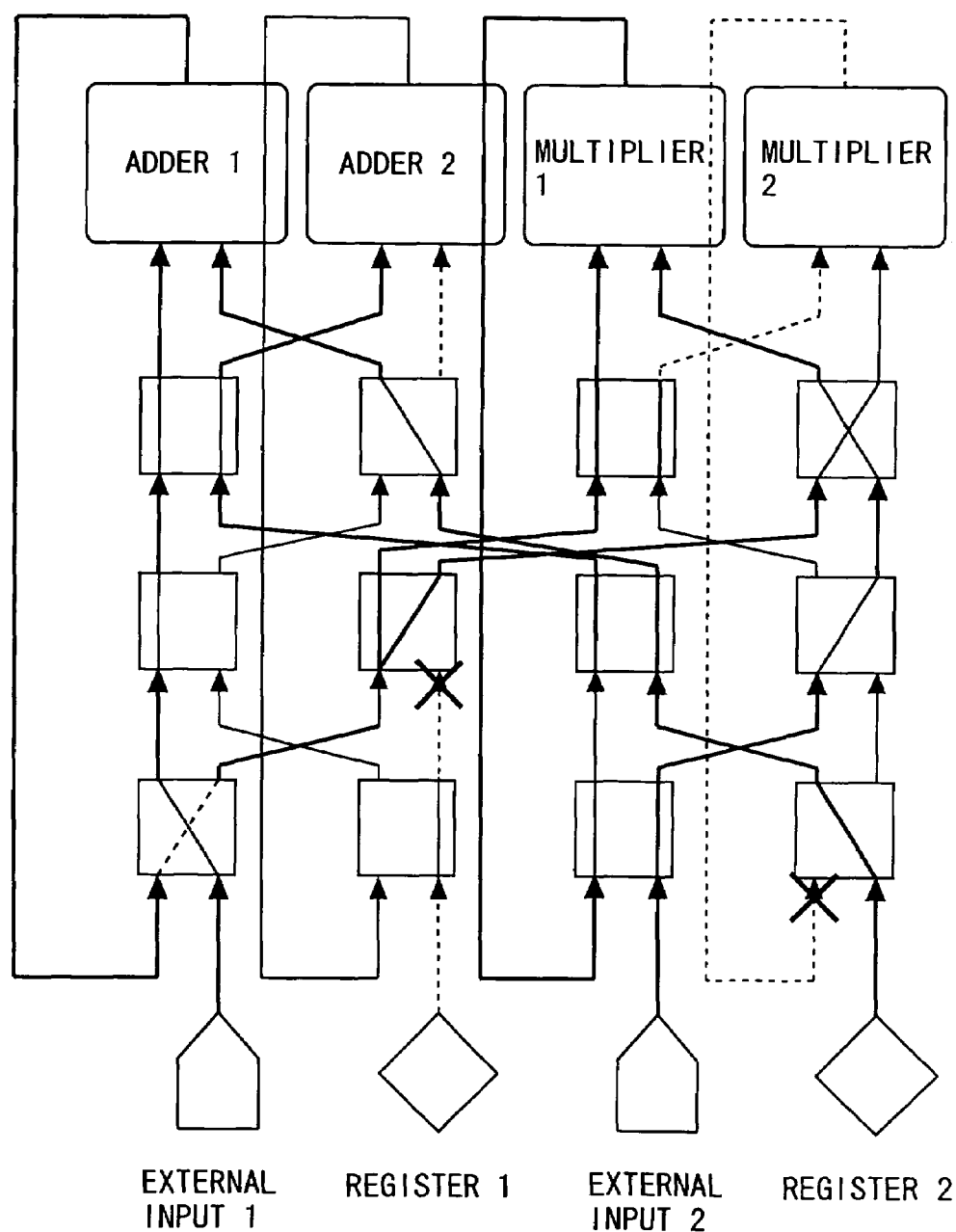
FIG. 7 is an example of the blocking characteristic in an application to which the indirect binary 3-cube network is applied.

Further, "switchover of PE input" in FIG. 12 implies a case of connecting the input terminals of a processing element to a different crossbar switch block, e.g., assigning the input terminals of Adder 1 to the neighboring crossbar switch blocks as shown in FIG. 7. Namely, it is the case where the evaluation criterion 1 is applied.

Further, "connection based on proposal method" implies a case of configuring based on the evaluation criterion 1 and the evaluation criterion 2, i.e., an implementation rate in the network in FIG. 9 is given therein.

As shown in FIG. 12, in the case of taking account of none of the compatibility of the processing element as in FIG. 10, the implementation rate of the application based on the indirect binary 3-cube network in which the eight (8) inputs are connected to the two multipliers and to the adder 2, is 12.9% of the whole connection count "16777216" (16777216 ways) by use of the non-blocking network. Moreover, in the indirect binary 3-cube network in which the inputs of the processing elements as shown in FIG. 7 are switched over according to the evaluation criterion 1, the implementation rate is 19.9%.

On the other hand, in the case of taking account of the compatibility of the processing element as shown in FIG. 9 and configuring the network according to the (evaluation criterion 1) and the (evaluation criterion 2), the implementation rate rises up to 62.8%. This is because as a result of configuring the network so as to reduce the constraint within the single processing element and the constraint between the same type of processing elements according to "evaluation criterion 1" and "evaluation criterion 2", in the implementation rate calculating flow in FIG. 11, the implementable combinations increase owing to the switchover between the input terminals of the same processing element or between the input terminals between the same type of processing elements.

Second Embodiment

Figure 13:
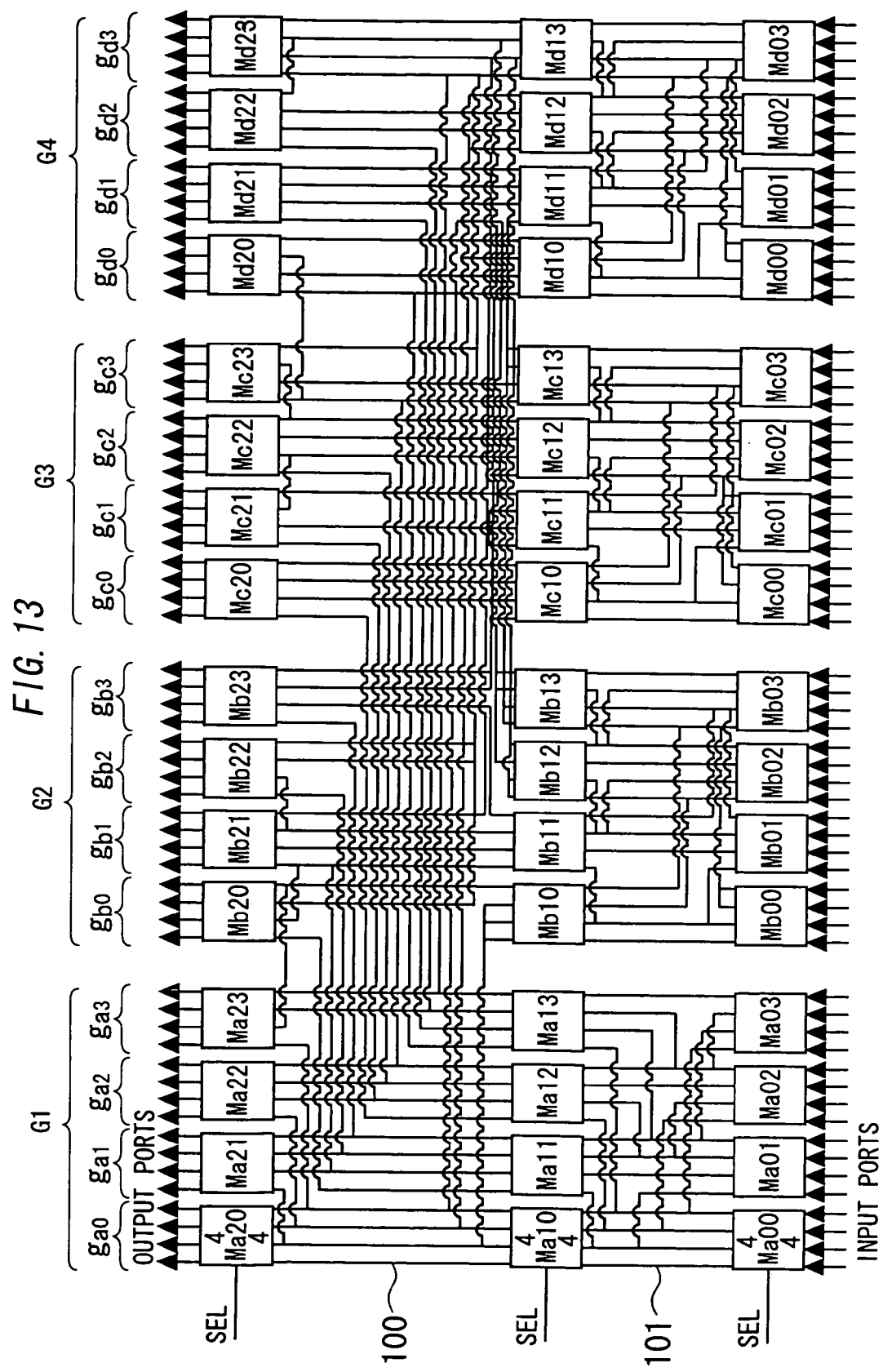
FIG. 13 is an example of a 64-input/64-output indirect binary 3-cube network using 4-input/4-output crossbar switches.

An example to which the invention is applied will be described as another working example by exemplifying a 64-input/64-output indirect binary 3-cube network configured by setting 4-input/4-output crossbar switches as a basic block and connecting these blocks at 3 stages. FIG. 13 shows an example of the 64-input/64-output indirect binary 3-cube network using the 4-input/4-output crossbar switches.

In this network, output terminals of the basic block at the third stage are connectable to only one of sixteen network input terminals (e.g., the input terminal of the basic blocks Ma00 through Ma03 connecting to a line 100) connected to one input terminal of the basic block at the third stage.

Further, one output (e.g., the output connecting to a line 101) of the basic block at the first stage is connected to sixteen network output terminals (e.g., sixteen output terminals of Ma20 through Ma23), and hence these sixteen network output terminals can select only one of the four input terminals of each basic block at the first stage.

To be specific, in FIG. 13, a group of Mx20 through Mx23 at the third stage (x is any one of a, b, c,or d) is connected from one output terminal of the basic block at the first stage. Further, a group of Mx00 through Mx03 at the first stage (x is any one of a, b, c, d) is connected to one input terminal of the basic block at the third stage. With this arrangement, the terminal-to-terminal distance is given as follows.

LT(i,j)=16; (Ti and Tj are two output terminals of a basic block at the third stage in FIG. 13)

LT(i,j)=4; (a case where Ti and Tj are output terminals of different basic blocks at the third stage that are reachable from one output terminal of any one of the basic blocks at the first stage in FIG. 13);

LT(i,j)=0; (a case other than the above) Considered now is a case of connecting, to this network, 14 ALUs (2-inputs/1-output), 4 multipliers (2-input/1-output), 4 internal memories (2-inputs/1-output), 4 register files (4-inputs/8-output), 4 external outputs and 4 external inputs.

Let Gz (z=1, 2, 3, or 4) be a group of the output terminals of Mx20 through Mx23 (x is a, b, c, or d), and let gxy be a group of the output terminals of Mx2y (x is a, b, c, or d, and y is any one of 0 through 3) defined as one piece of basic block.

At first, the 4-inputs register files are considered. The respective input terminals may be assigned one by one to the groups G1 through G4 in order to minimize the distance between the input terminals of the register files. Namely, it follows that the respective input terminals are assigned in distribution to groups such as (G1, G2, G3, G4) with respect to the 4 register files.

Figure 14A:
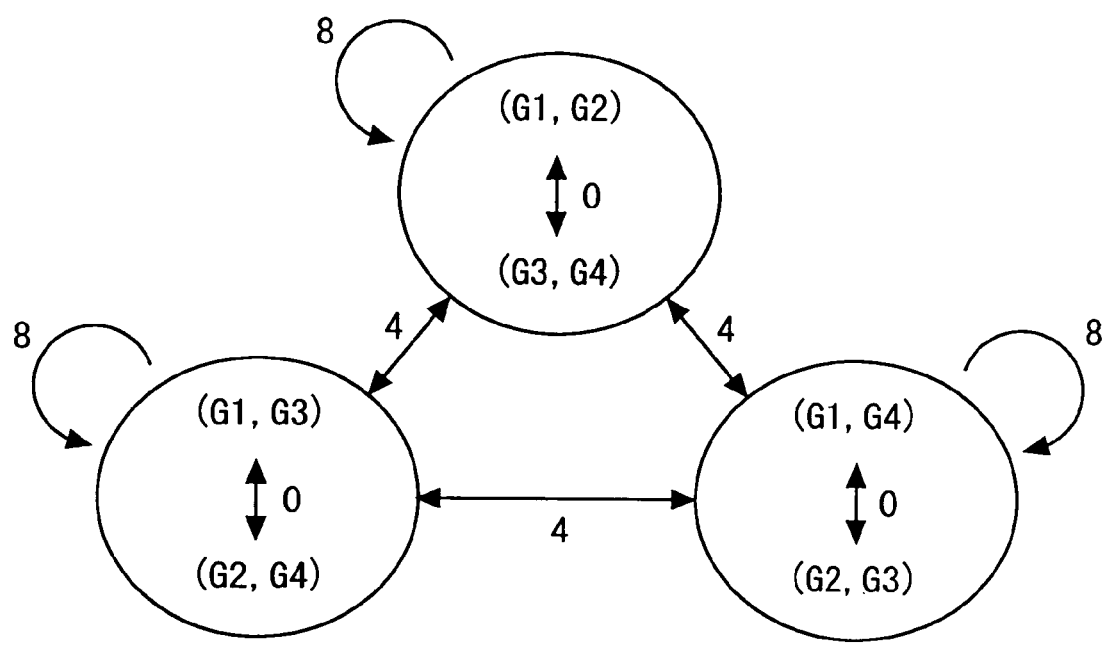

Next, 2-input processing elements (the multiplier, the internal memory, the ALU (adder)) are considered. There are six pairs of assigning two input terminals, such as (G1, G2), (G1, G3), (G1, G4), (G2, G3), (G2, G4), (G3, G4). FIG. 14A shows a minimum distance between these pairs with respect to these combinations. FIG. 14B shows a minimum distance between the pairs, (G1, G2), (G3, G4), (G1, G3), (G2, G4), (G1, G4) and (G2, G3) in a matrix form.

FIGS. 14A, 14B can be used to calculate distance in the case of assigning input terminals of a 2-inputs processing element to the output terminals of the network in FIG. 13. In the case of assigning the two input terminals to between the groups G1 and G2, between the groups G3 and G4, between the groups G1 and G3, between the groups G2 and G4, between the groups G1 and G4 and between the groups G2 and G3, it is shown that each distance is 0.

Moreover, if 4 input terminals of two processing elements of the same type are already connected to a tuple of groups (G1, G2) and a tuple of groups (G3, G4), a case of further assigning one 2-inputs processing element of the same type is considered. In this case, it is shown that constraint of a distance "4" between the tuple of groups (G1, G2) and anyone of tuples of (G1, G3), (G2, G4), (G1, G4), (G2, G3). It is also shown that constraint of a distance "4" between the tuple of groups (G3, G4) and anyone of tuples of (G1, G3), (G2, G4), (G1, G4), (G2, G3). Thus constraint 8 occurs when assigning the two input terminals of that processing element to any other tuples of groups such as (G1, G3), (G2, G4), (G1, G4), (G2, G3).

Furthermore, for example, in such a case that the two input terminals of the processing element are already connected to the tuple of groups (G1, G2), and in the case of further assigning the two input terminals of the processing element of the same type to the same tuple of groups (G1, G2), it is shown that constraint of a distance "8" occurs. This is the same with other tuples of groups (G3, G4), (G1, G3), (G1, G4), (G2, G3), (G3, G4).

From this Figure, for making the connection so as to decrease the mutual terminal-to-terminal distance, it is better to allocate repeatedly in the sequence such as (G1, G2)→(G3, G4)→(G1, G3)→(G2, G4)→(G1, G4)→(G2, G3)→(G1, G2)→ . . . , etc. The multiplier, the internal memory and the ALU (adder) are respectively assigned according to this sequence.

Now, the input terminals of the four register files are assigned to the respective groups G1 through G4. Construed next is the way of assigning the input terminals of the four register files to the group gxy in each of groups G1 through G4. At this time, if the inputs of the respective register files are assigned to different groups gxy, the distance between the input terminals belonging to the same group of anyone of G1 through G4 in each group gxy is 4. There are four pieces of such input terminals in each of groups G1 through G4 and there are also four groups, and consequently a distance between the respective register files is minimized such as 4×4×4=64.

Further, as to multipliers (2 input terminals×4=8 input terminals), the number of the input terminals of the multipliers can be limited to two at the most within one group Gx. Thus the input terminals of the multipliers within one group Gx can be assigned to the different groups of gxy. This is the same with the internal memory (2 input terminals×4=8 input terminals). Therefore, as to the RAM or the multiplier assigned to the same group Gx, the maximum distance can be set to 4 (the distance 4 because of belonging to the same group G1 through G4).

On the other hand, as to ALU (2 input terminals×14=28 input terminals), approximately seven terminals (28/4) in average are assigned to the same group, and hence it is required that three sets of two terminals be assigned to the same gxy. The number of terminals to be assigned to one gxy is 1 or 2. FIG. 15 shows an example of thus assigning the output terminals of the network in FIG. 13 to the input terminals of each processing element.

Herein, R1-1 through R1-4 represent the input terminals 1 through 4 of the register file R1. Accordingly, FIG. 15 shows that the input terminals 1 through 4 of the register file R1 are allocated to each of the groups G1 through G4, and are connected to gx0 (x=a through d). This is the same with Rk-1 through Rk-4 (k=2 through 4). Further, ALUk-A and ALUk-B (k=1 through 14) represent two input terminals of each of fourteen ALUs. Moreover, MLUk-A and MLUk-B (k=1 through 4) represent two input terminals of each of four multipliers. Still further, RAMk-A and RAMk-B (k=1 through 4) represent two input terminals of each of internal memories. Yet further, EOk (k=1 through 4) is external output.

These procedures enable actualization of the configuration that minimizes the constraint for the 64-input/64-output indirect binary 3-cube network configured by connecting the 4-input/4-output crossbar switches at three stages.

Namely, the evaluation criteria 1 and 2 can be applied without any limit to the number of terminals of crossbar switch blocks defined as the basic block. Further, the implementation rate of the application can be improved by configuring the network according to the evaluation criteria 1 and 2 with respect to a network other than the indirect binary 3-cube network as well as the indirect binary 3-cube network.

MODIFIED EXAMPLES

Each of the first embodiment and the second embodiment has exemplified the configuration capable of improving the implementation rate of the application in the case of connecting processing elements of different types to the output terminals at the third stage in the network configured by combining the rows of basic blocks at three stages. The embodiment of the invention is not, however, limited to the network with this configuration.

Figure 16:
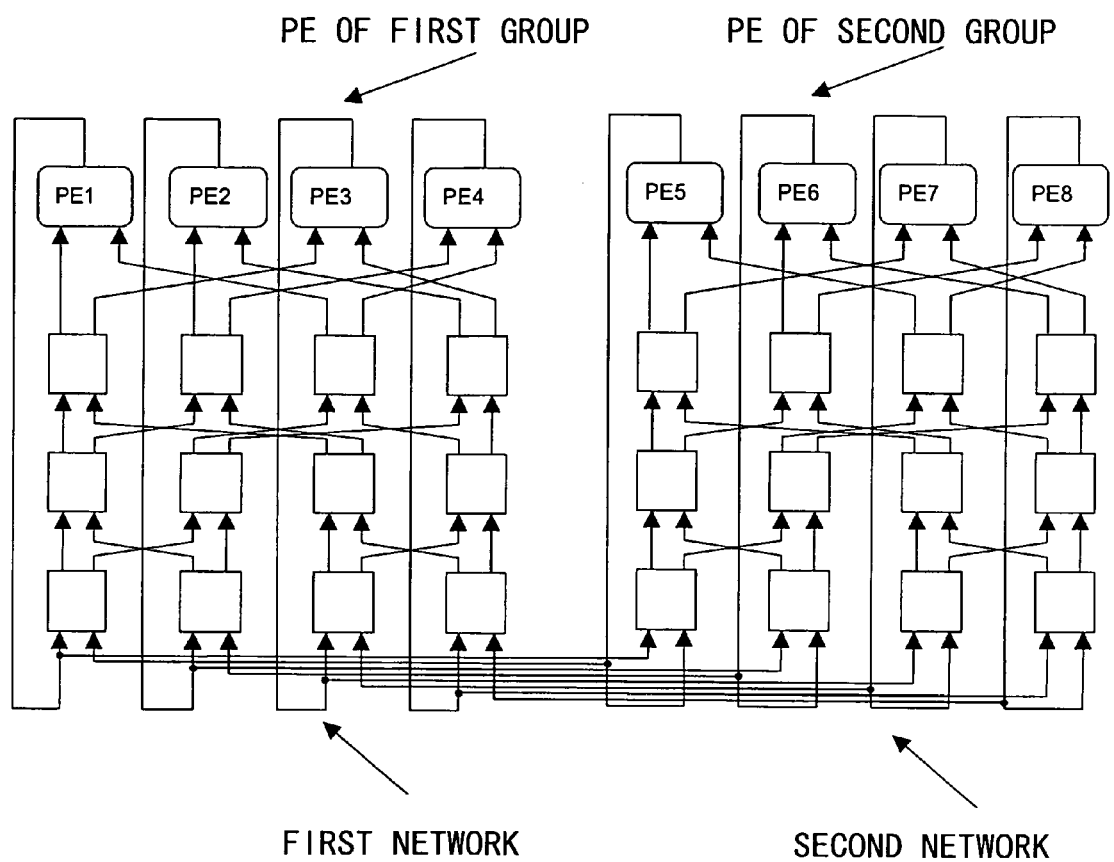
FIG. 16 is an example of a configuration of networks (a first network and a second network) that connect in parallel respective groups of the processing elements formed of plural groups.
Figure 17:
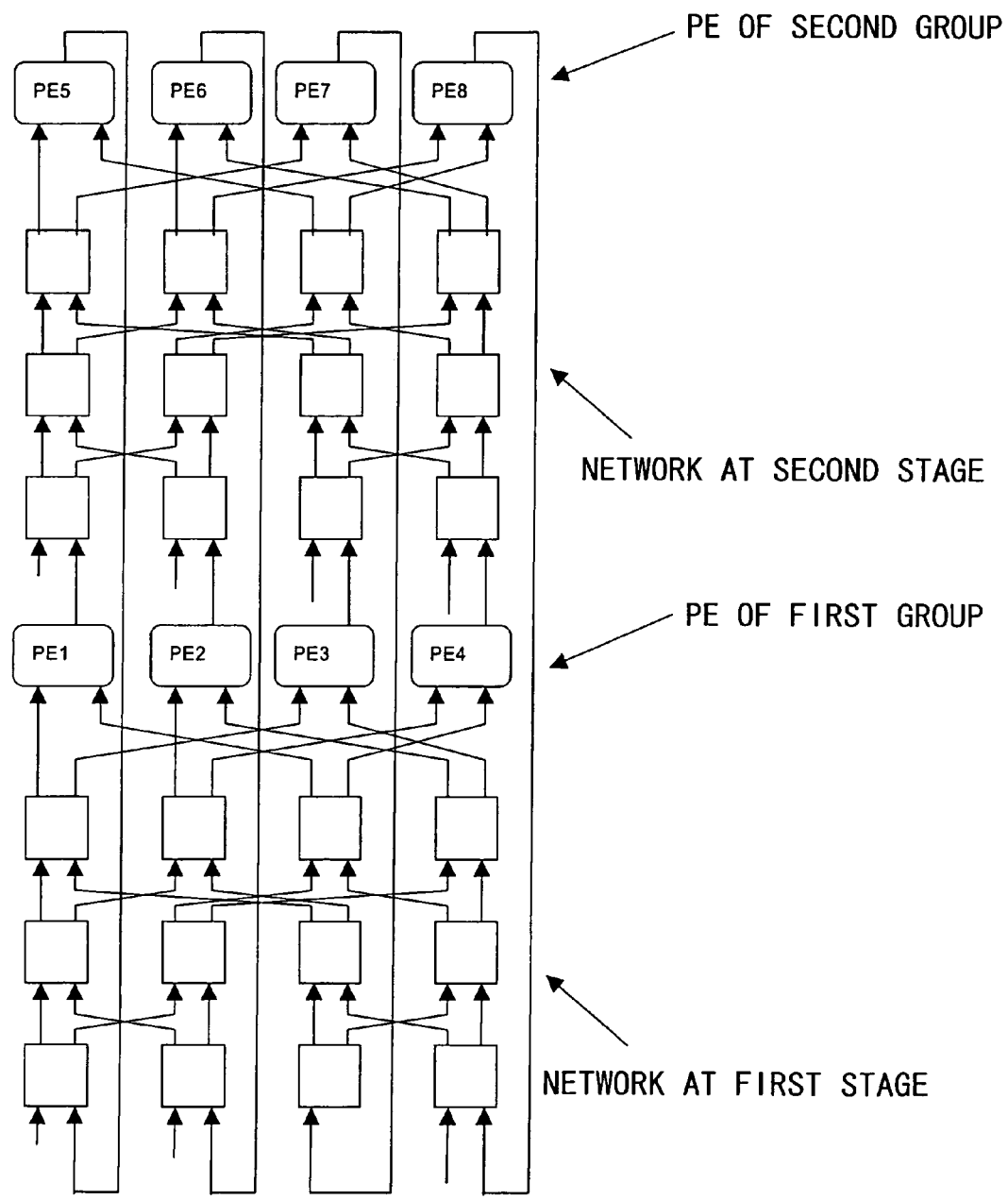
FIG. 17 is an example of a configuration of networks that connect in series the respective groups of the processing elements formed of the plural groups.

For example, the invention can be embodied for a network composed of a combination of basic networks for a plurality of groups, wherein processing elements are classified into a plurality of independent groups, and the network is configured for every some groups (e.g., the first group and the second group). Namely, the implementation rate of each individual group is improved by applying the evaluation criteria 1 and 2 for every individual group, whereby the implementation rate of the application composed of the network of the plurality of groups can be ameliorated. FIGS. 16 and 17 each show an example of configuration of such a network.

In FIG. 16, the network (a first group of network and a second group of network)is configured by connecting in parallel the respective groups of the processing elements formed of a plurality of groups. FIG. 16 illustrates processing elements of the first group and the second group.

In FIG. 16, in the first network, the network inputs are connected to processing elements of both the first group and the second group, and the network outputs are connected to processing elements of the first group. Further, in the second network, the network inputs are connected to processing elements of both the first group and the second group, and the network outputs are connected to processing elements of the second group.

In such a case also, the implementation rate can be improved by configuring the networks so as to satisfy the evaluation criterion 1 and the evaluation criterion 2 in the first network and the second network, respectively. It may not cause any inconvenience to take a configuration of connecting three or more networks in parallel and a configuration of establishing connections with other networks in parallel.

In FIG. 17, a (whole) network is configured by connecting in series the respective groups (a network at the first stage and a network at the second stage) of the processing elements. FIG. 17 illustrates processing elements of the first group and of the second group.

In FIG. 17, in the network at the first stage, inputs of processing elements of the first group are connected to outputs of processing elements of the second group. Further, in the network at the second stage, inputs of processing elements of the second group are connected to outputs of processing elements of the first group. In this case, in each of the networks at the first and second stages, the implementation rate of the application can be improved by configuring the network so as to satisfy the evaluation criterion 1 and the evaluation criterion 2.

Note that in the case of making the connection in series as in FIG. 17, one other network may be interposed between the network at the first stage and the network at the second stage. To be specific, it may not cause any inconvenience that the network at the first stage connects the processing elements of the first group to the processing elements of the second group, the network at the second stage connects the processing elements of the third group to the processing elements of the second group, and one other network may exist between the second group and the third group. Moreover, it may not cause any inconvenience to take a configuration of connecting three or more networks in series <Other>

The disclosures of Japanese patent application No. JP2005-243111 filed on Aug. 24, 2005 including the specification, drawings and abstract are incorporated herein by reference.

What is claimed is:

1. A circuit comprising:
   one or more operation elements executing numerical value operation or a logical operation for digital data to be inputted and outputting results of the numerical value operation or the logical operation,
   network output terminals connected to an input side of said operation elements,
   network input terminals to which the output signals of said operation elements or external signals other than the output signals of said operation elements are inputted, and
   a network structure connecting said network input terminals to said network output terminals,
   wherein said network structure configures a blocking network having a constraint against a combination of said network input terminal and said network output terminal, the constraint limiting further connection of, upon connecting a first network input terminal to a first network output terminal, second network input terminal to any one of second network output terminals, and
   said one or more operation elements and said network output terminals are connected so as to minimize a constraint strength between said plurality of network output terminals for inputting to said same operation element with respect to the constraint strength defined as the number of network input terminals contained in tuples of network input terminals to which two network output terminals in said network output terminals can not be simultaneously connected.

2. The circuit according to claim 1, wherein said operation elements and said network output terminals are further connected so as to minimize the constraint strength between said network output terminals connected to said plurality of operation elements logically having compatibility in said operation elements.

3. The circuit according to claim 2, wherein when a constraint strength $LT(k, l)$ between an operation element $P_k$ and an operation element $P_l$ to which said network output terminals are connected, are defined by the following formula, said operation elements and said network output terminals are connected so as to minimize each of two functions $F_1()$ and $F_2()$;

(Formula 1)
LT(i, j)=the number of network input terminals to which network output terminals Ti and Tj can not be connected simultaneously;

$$LP(k, 1) = \sum LT(i, j);  \quad \text{(Formula 2)}$$

$Pk \ni$ a connecting destination of $Ti$;

$Pl \ni$ a connecting destination of $Tj$;

$Pk, Pl$ : operation elements $Ti, Tj$ : network output terminals

| | |
|---|---|
| F1 ( ) = Σ ( | ΣLT(i, j)); |
| k is an index of each operation element; | Pk ∋ the connecting destination of Ti, Tj; |
| F2 ( ) = Σ ( | ΣLP(k, l)); |
| All types of the operation elements; | Pk, Pl are the same type of operation elements; |

4. The circuit according to claim 1, wherein said operation elements are separated into a plurality of groups, and the signals are transmitted and received between said operation elements belong to different groups, said network structure includes a first network structure and a second network structure, said first network structure inputs the output signals of some of said operation elements of the first group and the second group, and outputs the output signals to said operation elements of the first group, and said second network structure inputs the output signals of some of said operation elements of the first group and the second group, and outputs the output signals to said operation elements of the second group.

5. The circuit according to claim 4, wherein said first network structure and said second network structure establish connections with said operation elements of the first group and with said operation elements of the second group from output terminals of said operation elements of the first group and of said operation elements of the second group in parallel with each other.

6. The circuit according to claim 4, wherein said first network structure and said second network structure establish connections between output terminals of said operation elements of the first group and input terminals of said operation elements of the second group and between output terminals of said operation elements of the second group and input terminals of said operation elements of the first group in series to each other.

7. A circuit connecting method of connecting a circuit, wherein the circuit includes one or more operation elements executing numerical value operation or a logical operation for digital data to be inputted and outputting output signals of the numerical value operation or the logical operation, network output terminals connected to an input side of said operation elements, network input terminals to which the output signals of said operation elements or external signals other than the output signals of said operation elements are inputted, and a network structure connecting said network input terminals to said network output terminals, the circuit connecting method comprising:

said network structure configuring a blocking network having a constraint against a combination of said network input terminal and said network output terminal, the constraint limiting further connection of, upon connecting a first network input terminal to a first network output terminal, a second network input terminal to any one of second network output terminals, a connecting said one or more operation elements and said network output terminals to minimize a constraint strength between said plurality of network output terminals for inputting to said same operation element with respect to the constraint strength defined as the number of network input terminals contained in tuples of network input terminals to which two network output terminals in said network output terminals can not be simultaneously connected.

8. The circuit connecting method according to claim 7, wherein said operation elements and said network output terminals are further connected so as to minimize the constraint strength between said network output terminals connected to said plurality of operation elements logically having compatibility in said operation elements.

9. The circuit connecting method according to claim 8, wherein when a constraint strength LT(k, l) between an operation element Pk and an operation element Pl to which said network output terminals are connected, are defined by the following formula, said operation elements and said network output terminals are connected so as to minimize each of two functions F1() and F2();

(Formula 1)
LT(i, j)=the number of network input terminals to which output terminals Ti and Tj can not be connected simultaneously;

$$LP(k, 1) = \sum LT(i, j);  \quad \text{(Formula 2)}$$

$Pk \ni$ a connecting destination of $Ti$;

$Pl \ni$ a connecting destination of $Tj$;

$Pk, Pl$ : operation elements $Ti, Tj$ : network output terminals

\* \* \* \* \*